United States Patent [19]

Carroll

[11] Patent Number: 4,845,820

[45] Date of Patent: Jul. 11, 1989

[54] PROCESS FOR MAKING CASSETTE SPRING

[75] Inventor: William M. Carroll, Milwaukee, Wis.

[73] Assignee: Koller Manufacturing Corporation, Milwaukee, Wis.

[21] Appl. No.: 53,316

[22] Filed: May 22, 1987

[51] Int. Cl.⁴ ............................................. B21F 35/00
[52] U.S. Cl. ...................................... 29/173; 53/447; 267/158
[58] Field of Search ............... 29/173, 564.6, 566.1, 29/566.2; 414/69, 92, 86; 267/47, 158, 160; 53/435, 469, 447

[56] References Cited

U.S. PATENT DOCUMENTS

| | | | |
|---|---|---|---|
| 3,014,601 | 12/1961 | Swanson | 414/69 |
| 3,194,098 | 7/1965 | Kimball et al. | 29/564.6 |
| 3,195,228 | 7/1965 | Beacham | 29/430 |
| 3,937,456 | 2/1976 | Gruodis et al. | 414/86 |
| 4,717,091 | 1/1988 | Schoettle et al. | 242/199 |

*Primary Examiner*—P. W. Echols
*Attorney, Agent, or Firm*—Kinzer, Plyer, Dorn, McEachran & Jambor

[57] ABSTRACT

A method for making a reel-pressure spring for a magnetic tape cassette begins by feeding a strip of spring material from a traverse-wound coil into a first work station of a punch press. The strip material has a width equal to the width of the finished spring. A die pierces the strip material to form mounting holes. The strip material is then fed into a shaping die of a second work station. A cutoff punch severs a blank from the end of the strip material by cutting across the full width of the strip. A shaping die at the second work station shapes the blank into a finished spring, which is then ejected from the second work station to a discharge chute. Finished springs are stacked in the discharge chute in the order in which they are made in the second work station. The stack is packaged so as to maintain the stack intact until such time as the springs are assembled into a cassette.

16 Claims, 5 Drawing Sheets

PROCESS FOR MAKING CASSETTE SPRING

BACKGROUND OF THE INVENTION

This invention relates to a method of making a reel-pressure spring for magnetic tape cassettes or cartridges, such as the type commonly used in video cassette recorders. The invention is particularly concerned with a method of making a reel-pressure spring having a uniform width throughout, i.e., the spring has parallel edges. Such a spring is described and claimed in U.S. patent application Ser. No. 030,698, filed Mar. 25, 1987, now U.S. Pat. No. 4,770,367 and assigned to the present assignee. The disclosure of this application is incorporated herein by reference.

Reel springs are used in a cassette to rotatably mount the tape reel shafts. Prior art reel springs are shown in Maehara, U.S. Pat. No. 4,544,062, and Sato et al, U.S. Pat. No. 4,593,868. These springs have a generally rhombic outline, typically stamped out of a continuous strip of spring material. With a rhombic spring outline a significant portion of the metal strip is trimmed away and discarded. Another difficulty with a rhombic outline is the high number of lineal inches of material which must be stamped or cut. The high number of lineal inches of cut requires the use of a large, progressive die which breaks down the high total inches cut into small portions cut at a series of work stations.

Figure 1:
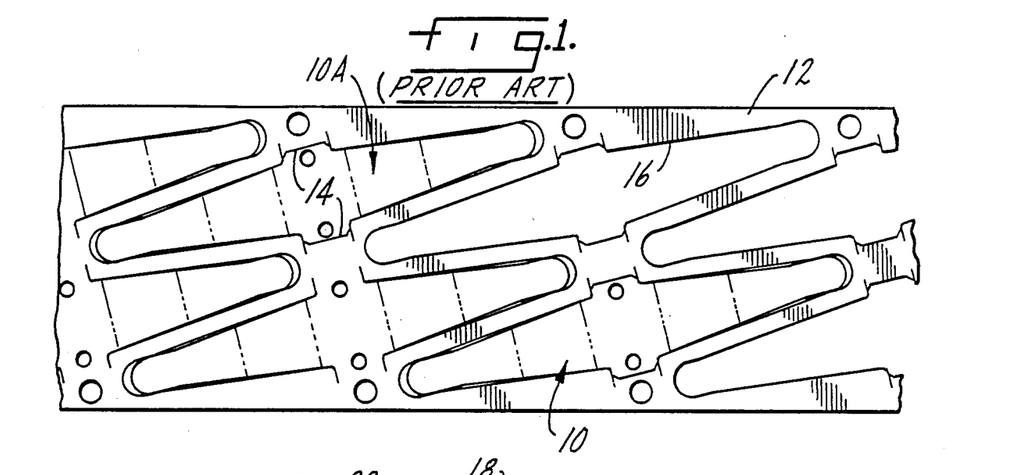
FIG. 1 is a view of the end portion of a strip, illustrating the forming steps in a prior art process.

FIG. 1 illustrates a representative sample of this prior art procedure for forming reel springs. FIG. 1 illustrates the strip material as it would look at the last two stations of an eleven station die. Springs 10 are formed in a carrier strip 12 of spring material. In this illustration two springs are made at each work station. The springs are nested as shown to utilize a greater percentage of the overall strip material. Spring 10A is complete, except for blanking through along the center tab lines 14. Once this is done the spring is ejected from the die into a bin for further processing. The ejected spring leaves an opening in the strip material, as shown at the work station to the right of spring 10A. This illustrates the high number of lineal inches of material that must be cut. The entire periphery 16 must be cut at one point or another in the progressive die.

This large amount of lineal inches of cut necessitates the use of a die lubricant. Some of the lubricant inevitably winds up on the finished springs, rendering them unfit for use until they are cleaned to remove the lubricant. This is typically done by tumbling the finished springs in corncob chips. After cleaning, the springs have to be oriented and stacked for packing. Since the springs will be stacked at random with respect to the order in which they were stamped out of the strip material, the tolerance variations between adjacent springs in the stack will similarly be entirely random. That is, one spring may be at the full positive tolerance allowed while an adjacent spring is at the full negative allowable tolerance. Both parts are within the specifications, but they are at opposite extremes of the tolerance envelope. This creates difficulties for the automated assembly equipment used to place the individual springs in a cassette. Such equipment can handle spring size variations within the tolerance envelope so long as the tolerance variations from one spring to the next are reasonably smooth or continuous. The assembly equipment, however, tends to falter when presented with abrupt changes of springs from one side of the tolerance envelope to the other. In the past, abrupt changes in the tolerance variation of adjacent springs in a stack have been handled by visually checking the stack and manually removing those parts which appear to be appreciably different in size from their neighbors. This process is slow, unreliable and labor intensive.

Another drawback with the prior art springs and the process for making them is the large die required is complex and expensive to make, and it requires a great deal of maintenance to keep it operating. The down time for die maintenance becomes a significant factor limiting the production available from the manufacturing process. In other words, the multiple station dies require a relatively high capital investment which is then tied up in non-productive time for die maintenance.

Yet another difficulty with the prior art is the type of coil used limits the supply of strip material. The multiple station die is most productive when making two parts at once, as shown in FIG. 1. This requires the use of a wide strip of spring material which can only be ribbon-wound on a coil. In a typical operation the ribbon-wound coil can supply a machine for about 45 minutes before a new one has to be installed, a procedure which takes about 15 minutes.

SUMMARY OF THE INVENTION

The present invention seeks to avoid the aforementioned difficulties through the use of an improved process for manufacturing reel-pressure springs. This is done by making a spring having a uniform width rather than the variable width of the rhombic-shaped springs. A strip of spring material is fed from a coil to a press having only two work stations where the strip is pierced, severed and formed into a finished spring. The strip material has a width equal to the width of the finished spring so that no cutting takes place along the edges of the spring. Further, the springs are formed in end-to-end fashion by severing a spring blank from the end of the strip. The blank is then formed into the finished spring form. Thus, the only cutting done is at the ends of the spring. This greatly reduces the number of lineal inches of cutting required, thereby allowing the springs to be formed in only two work stations. Further, the minimal lineal inch cut permits the die to be run dry, i.e., without any lubricant. Since no lubricant is used, the cleaning step is eliminated and the springs can be stacked for shipment immediately upon exit from the die, in the order in which they come out of the die. This inherently provides control over the tolerance variation so that the variation is a smooth, continuous curve. The springs are packaged as they come out of the die to retain the stack intact until it can be supplied to automated assembly equipment.

The fact that the strip material fed to the die has a width equal to the final spring width also greatly reduces material waste. The amount of scrap produced compared to prior art springs is minimal. Further, the relatively narrow width of the strip material allows it to be traverse wound on a coil. Traverse winding, also known as oscillated winding, greatly increases the amount of material on one coil. In a typical operation the traverse-wound coil will supply a machine for eight hours before requiring a new coil.

DETAILED DESCRIPTION OF THE INVENTION

Figures 2, 3:
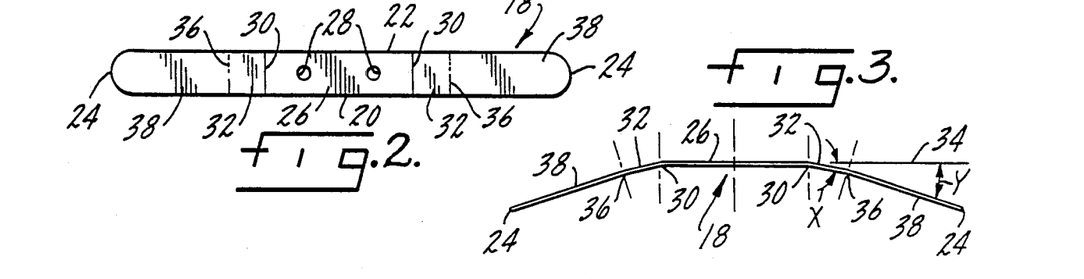
FIG. 2 is a view of the reel-pressure spring fabricated in accordance with the present invention.
FIG. 3 is a side view of the spring of FIG. 2.

The reel spring 18 made in accordance with the method of the present invention is illustrated in FIGS. 2 and 3. As can be seen, the spring is an elongated strip of generally rectangular configuration having rounded tips. The spring has first and second parallel edges 20 and 22 which extend substantially throughout the length of the strip. Rounded tips 24 are provided at the ends of the spring. The spring has a flat, central base portion 26 which will adjoin the surface of the upper cassette section when the spring is installed. A pair of holes 28 are provided in the base to facilitate attachment of the spring to the cassette. A pair of transverse forms or fold lines 30 determine the extent of the base portion 26 and define transition portions 32 of the spring. The transition sections extend out of the plane of the base at angle X (FIG. 3) compared to the base line 34. In the embodiment shown, the angle X is 10°. A second set of transverse forms or fold lines 36 determines the extent of the transition sections 32. Forms 36 define end portions 38 of the spring which extend at a second, sharper angle Y to the plane of the base portion 26. In the embodiment shown, the angle Y is 17°. The end portions 38 terminate with the rounded tips 24. The forms 30 and 36 impart an overall curved configuration to the spring. Preferably, the spring is made of stainless steel having a thickness of about 0.012 inches.

Figure 4:
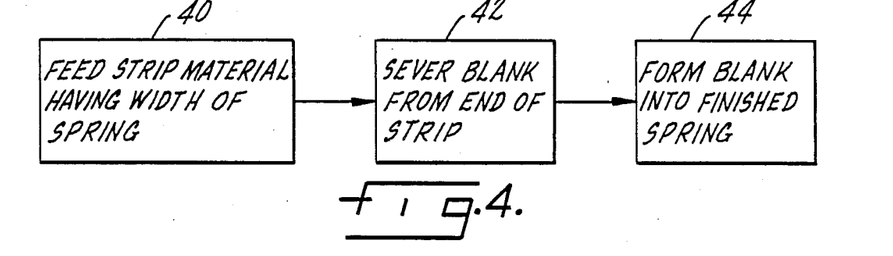
FIG. 4 is a block diagram illustrating the steps of one aspect of the invention.

FIG. 4 describes generally the steps of the present invention's method of making the reel spring shown in FIGS. 2 and 3. The first step shown at 40 is feeding a strip of spring material into a shaping die. The strip of spring material has a width equal to the width of the finished spring. As used herein, the term "width" refers to the distance between the side edges 20 and 22. The next step 42 of the method is severing an individual spring blank from the end of the strip by cutting completely across the width of the strip. In other words, the spring blank is cut from the end of the strip prior to forming the crimps 30 and 36. Thus, the spring blanks come off the strip in end-to-end fashion. The term "spring blank" refers to a severed portion of the strip of spring material, cut to the proper length, prior to formation of the crimps or folds. At step 44 the spring blank is formed into a finished spring by bending or folding the blank at the form lines to impart the curved configuration shown in FIGS. 2 and 3.

Two of the important aspects of the method shown in FIG. 4 are that the strip material has the width of the finished spring and the springs are cut from the strip material in end-to-end fashion. This affords great reduction in the number of lineal inches of material that must be cut. Also, the amount of scrap or waste is virtually eliminated compared to prior processes.

Figure 5:
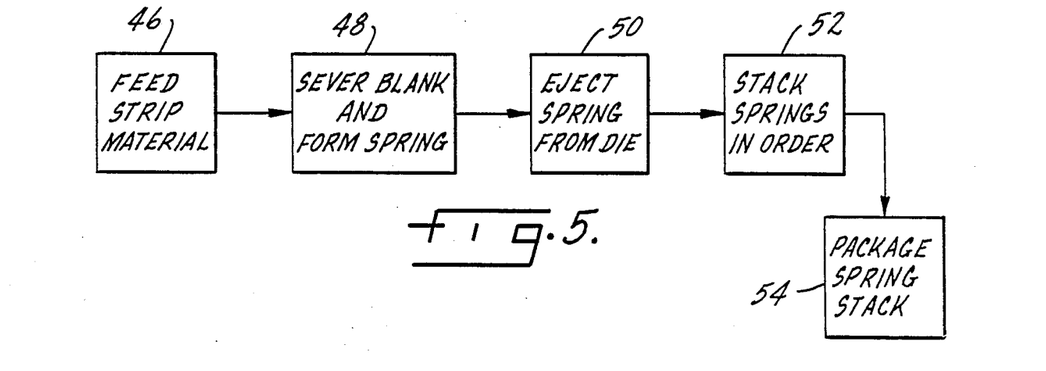
FIG. 5 is a block diagram illustrating the steps of another aspect of the invention.

FIG. 5 illustrates the method of the invention in another of its aspects. The first step 46, as before, is to feed a strip of spring material into a shaping die. There, the strip material is severed into a spring blank and the blank is formed by the shaping die into a finished spring, as shown at 48. The next step 50 of the method is ejecting finished springs from the shaping die into a discharge chute. Step 52 calls for stacking the finished springs in the discharge chute in the order in which they were formed in the shaping die. Step 54 requires packaging of the stacked finished springs in means for maintaining the stack intact. A preferred form of packaging is simply a plastic bag whose open end is tied about the stack.

One of the significant aspects of the method in FIG. 5 is the elimination of the cleaning process allows the springs to be stacked in the order they come out of the die. Consequently, the springs will inherently have a continuous tolerance variation. As used herein, the term "continuous tolerance variation" means the differences in dimensions between adjacent parts in the stack will be small compared to the allowable tolerance indicated in the spring's specifications. This is meant generally in the mathematical sense that the value of a particular spring dimension at one spring in the stack is approached by the values at neighboring springs.

The method of the present invention can be performed on a press such as a Bihler Vari-slide press or other similar presses. Operating speeds of 325 strokes per minute have been achieved on such a machine. The press is equipped with tooling defining two stages or work stations. The first station includes a punch die for piercing the mounting holes in the spring. The second work station includes a shaping die which severs the spring blank from the end of the strip material and forms the finished spring. Means are provided at the second work station for ejecting finished springs to the discharge chute. Details of the tooling are shown and described below.

Figures 6, 8:
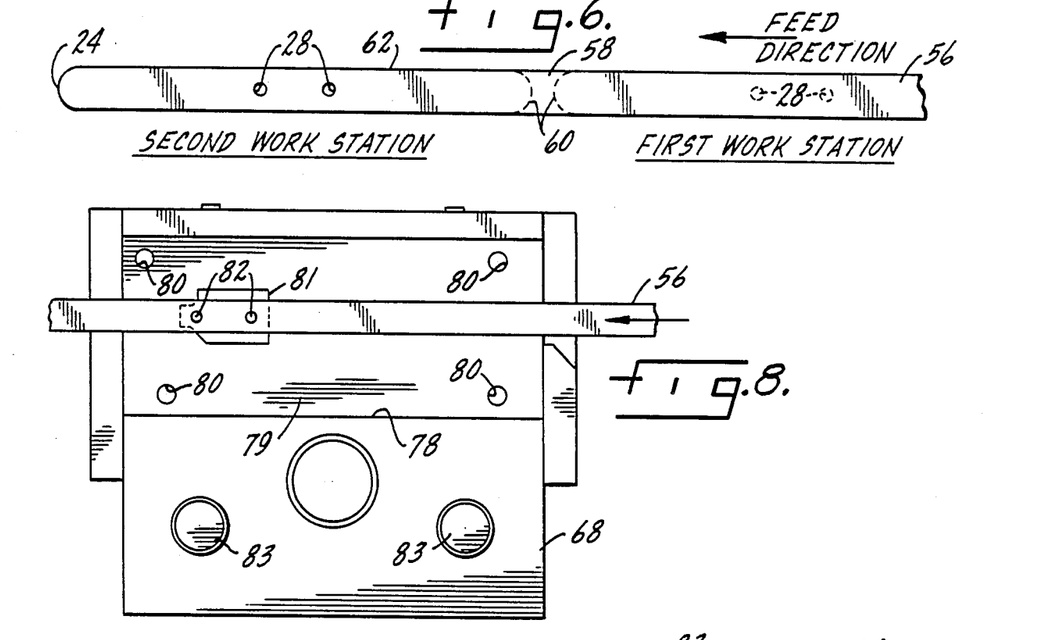
FIG. 6 is a schematic plan view of the strip material as it would appear in the first and second work stations of the present invention.
FIG. 8 is a top view of the bottom section of the punch die.
Figures 7, 9, 10:
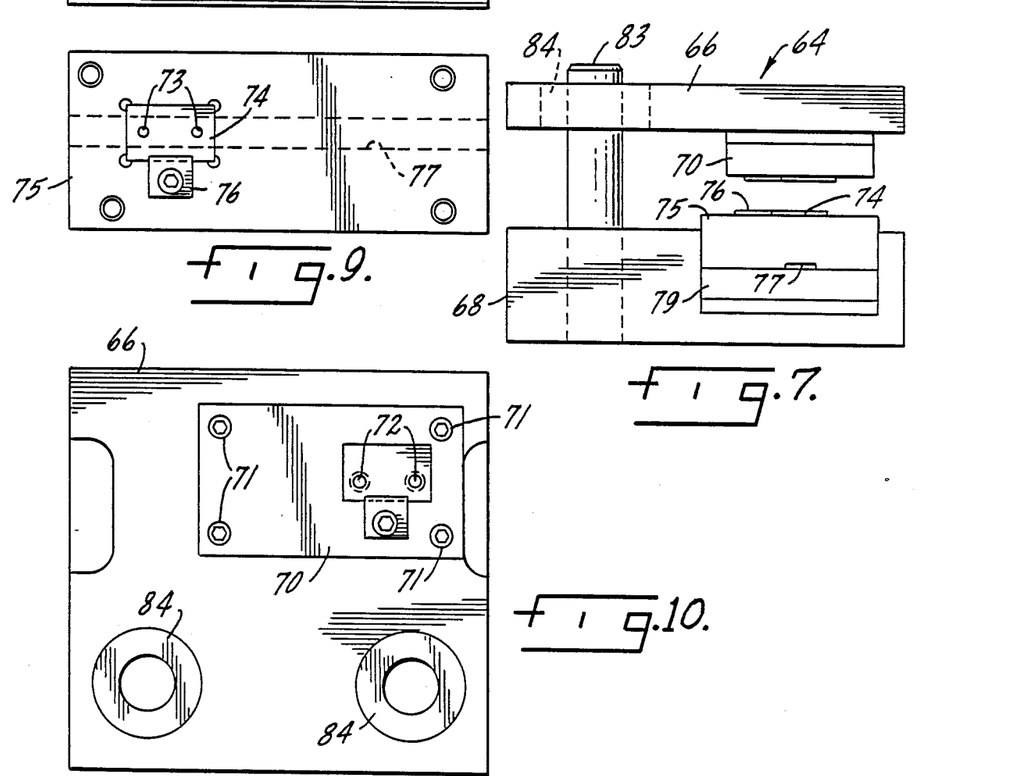
FIG. 7 is an end elevation view of the punch die tooling at the first work station.
FIG. 9 is a top plan view of the stripper section which fits in the well of the die's bottom section of FIG. 8.
FIG. 10 is an underside view of the upper section of the punch die at the first work station; in operation it overlies the bottom section on of the die.

FIG. 6 shows a diagrammatic illustration of the status of the strip material 56 at the first and second work stations. The strip material is fed by conventional apparatus in the direction indicated into the first work station. An optional feature is a wiper for cleaning the strip material prior to feeding it into the first work station. The strip is pierced at the first station to form the mounting holes 28. The strip is then pushed into the second work station where it is clamped and then severed from the end of the strip. The severing is performed by punching out the hourglass-shaped portion 58. The curved cut lines 60 define the trailing edge of the spring blank 62 in the second work station and the leading edge of the strip 56 which is about to be fed into the second work station. It can be appreciated that the hour-glass-shaped portion 58 is the only scrap produced by this method of manufacture.

Turning now to the specific tooling used to perform the method of the invention, the punch die is shown generally at 64 in FIGS. 7-10. The punch die 64 defines the first work station. The punch die includes upper and lower die shoes 66 and 68 which are installed in and actuated by a punch press which, in normal operation, causes vertical reciprocation of the upper die shoe 66 relative to the stationary lower die shoe 68. A punch pad 70 is affixed by screws 71 to the upper die shoe 66. The pad 70 carries piercing tools 72 in the form of pierce punches. These punches form the mounting holes 28 in the strip 56 of spring material. The piercing tools cooperate with openings 73 in a wear plate 74 which is attached to the top of a stripper plate 75 by a clip 76. The stripper plate has a shallow channel 77 on its underside for guiding the strip and holding it down during retraction of the piercing tools. The stripper plate 75 fits in a well 78 in the lower shoe, on top of a die block pad 79 which is also in the well. The stripper plate 75 and die block pad 79 are fixed to the lower shoe by screws into holes 80. A second wear insert 81 has holes 82 for receiving the piercing tools 72. The upper and lower die shoes are maintained in alignment by leader pins 83 mounted in the lower die shoe 68 and cooperating with bushings 84 formed in the upper die shoe 66.

Figure 11:
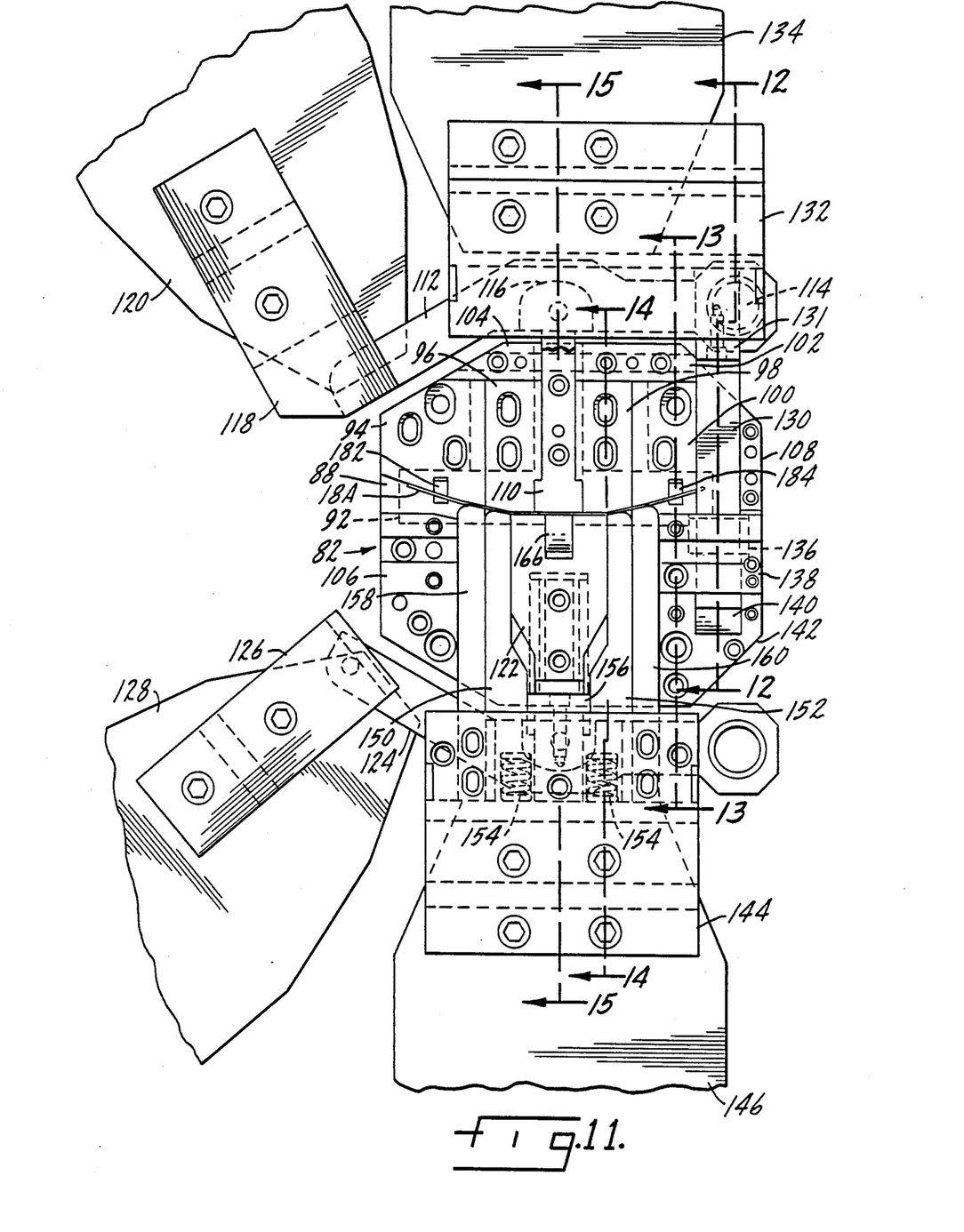
FIG. 11 is a front elevation view of the shaping die at the second work station, with portions removed to reveal underlying components.
Figure 12:
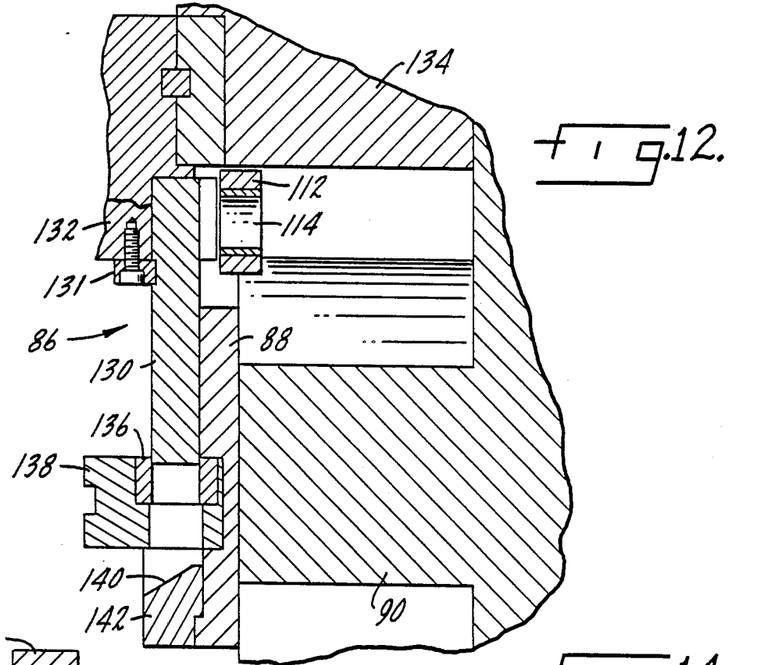
FIG. 12 is a section taken along line 12—12 of FIG. 11.

FIGS. 11-16 illustrate the shaping die 86 of the second work station. FIG. 11 is a front elevation view of the second work station, with portions removed, as it would be viewed by the operator. The first work station is located to the right of the second work station. Consequently, the strip material is fed from the right side of the die 86. As described above, the end of the strip is cut off to form a spring blank. The blank is formed into a completed spring 18 which is then ejected forwardly (i.e., toward the operator) to a discharge chute where the springs are stacked in the order in which they are formed.

The die 86 includes a back plate 88 which is attached to the press frame members 90. A wear plate 92 is inserted in the front face of the back plate at the level where the strip material is fed into the shaping die. The back plate mounts four stationary former tools 94, 96, 98 and 100. The stationary tools are constrained in a vertical direction by locater bars 102 and 104. The back plate 88 further includes stationary guide pieces 106 and 108 and a stationary top gripper 110. The top gripper 110 resides in a channel formed by the locater bars 102, 104 and the stationary tools 96 and 98.

Figure 15:
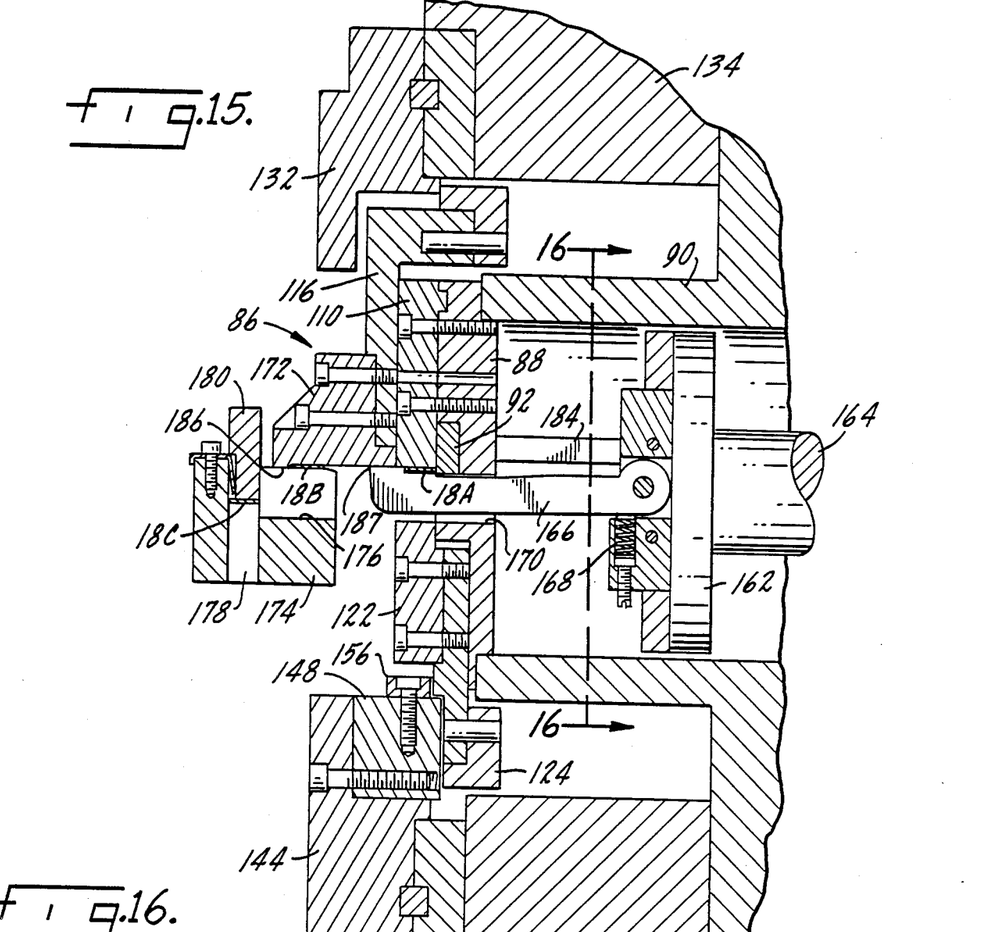
FIG. 15 is a section taken along line 15—15 of FIG. 11.

Tuning now to the movable portions of the shaping die 86, FIG. 15 shows an upper ejector guide 172 driven by a drive arm 112, which is pivoted at 114. A link 116 connects the drive arm 112 and the ejector guide 172. A drive link 118 connects the drive arm 112 to a slide 120. The slide is driven by the press to impart the motion necessary to move the ejector guide up and down slightly.

The counterpart to the top gripper 110 is a Y-shaped bottom grippe 122. The bottom gripper 122 is connected to a drive arm 124. Drive link 126 connects the arm 124 to a drive slide 128. The press actuates the drive arm 124 by means of the slide 128 to move the bottom gripper 122 up and down. The top and bottom grippers cooperate to clamp the strip material therebetween and hold it fixed for cutoff and forming operations. When the spring is completed, the bottom gripper moves downwardly to release the spring to the discharge chute, in a manner which will be explained below.

Once the end of the strip material is clamped by the grippers, it is severed from the rest of the strip by a cutoff punch 130. The cutoff punch is fastened by a clip 131 to a top tool holder 132 which, in turn, is driven up and down by a slide 134. The cutoff punch 130 slides in a channel formed by the guide piece 108 and stationary tool 100. The cutoff punch cooperates with a die 136 (FIG. 12) which is mounted in a die holder 138. Scraps, such as the hourglass-shaped piece 58, are directed out a chute 140 of a stationary block 142 which is fastened to the back plate 88.

After the spring blank is formed by the cutoff punch, a plurality of former fingers bend the spring blank into the configuration of the finished spring. The former fingers are carried by a bottom tool holder 144 which is driven by a slide 146. A mounting block 148 (FIG. 14) fastened to the holder 144 mounts inside former fingers 150 and 152. The inside former fingers are urged upwardly by springs 154. A spacer 156 on top of the block 148 maintains the proper spacing between the lower portions of the inside former fingers. An outside former finger 158 is attached to the tool holder 144 and slides in a channel formed by the guide piece 106 and inside finger 150. A second outside former finger 160 similarly slides in a channel formed by inside finger 152, the edge of block 142 and die holder 138. The former fingers 150, 152, 158, 160 cooperate with the stationary tools 94, 96, 98, 100 to form the crimped and angled portions of the finished spring. Due to the spring loading of the inside former fingers they will contact the spring blank first and form the first set of crimps 30 to be followed by the outside former fingers which create the second set of crimps 36. FIG. 11 illustrates a spring 18A which has just been fully formed.

Figure 13:
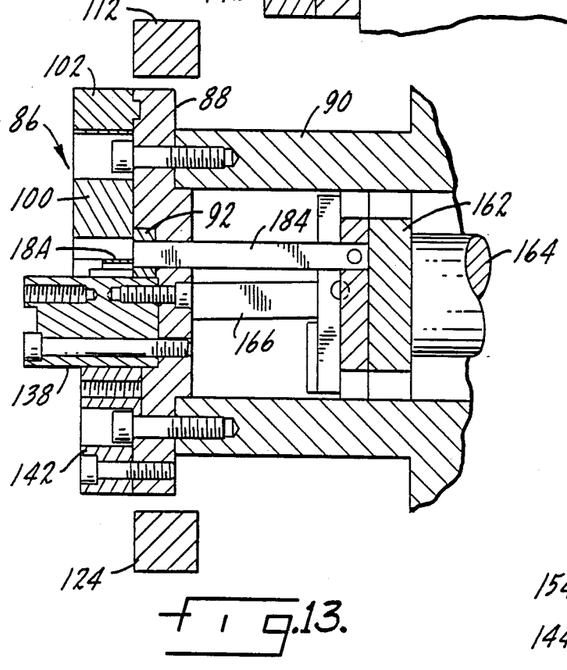
FIG. 13 is a section taken along line 13—13 of FIG. 11.
Figure 14:
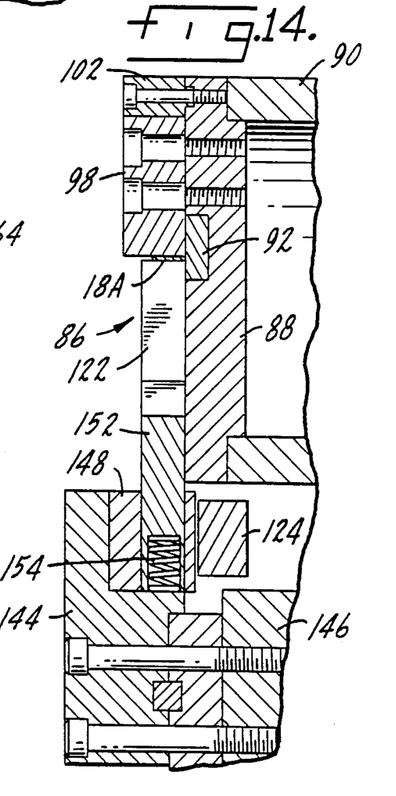
FIG. 14 is a section taken along line 14—14 of FIG. 11.
Figure 16:
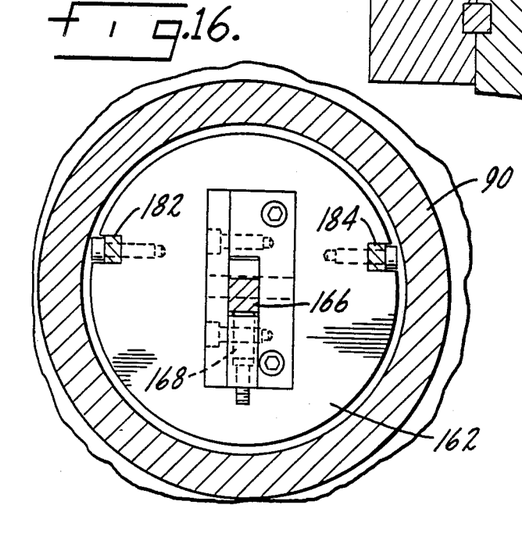
FIG. 16 section taken along line 16—16 of FIG. 15.

FIGS. 13, 15 and 16 illustrate the mechanism for ejecting a finished spring 18A from the shaping die 86. That mechanism includes a mandrel 162 mounted on shaft 164. The shaft is driven forwardly and backwardly by the press. An ejector arm 166 is pivotally mounted on the mandrel and biased in a clockwise direction (as seen in FIG. 15) by a spring 168. The ejector arm extends through an opening 170 in the back plate 88 and between the upper ends of the Y-shaped bottom gripper 122. The spring 168 biases the arm into engagement with the underside of the upper ejector guide 172 which is attached to the link 116. A lower ejector guide 174 has a slot 176 which receives the ejector arm 166 when it moves forwardly. The lower ejector guide 174 also forms the discharge chute 178. A stuffer 180 is connected by means not shown to the upper tool holder 132. Ejector fingers 182 and 184 (FIGS. 11, 13 and 16) are connected to the mandrel 162. The fingers extend through openings in the back plate 88, wear plate 92 and stationary tools 94, 100.

Looking again at FIG. 15, the sequence of events for ejecting a finished spring can be seen. The spring shown at location 18A has just been completed. At that time the mandrel 162 moves forwardly while the bottom gripper moves down to release the spring. The ejector fingers contact the outer portions of the spring and move it forwardly from the location of the spring 18A to the location of a spring shown at 18B. The top surface of the ejector arm 166 provides support during this movement until the spring is located opposite the lower guide block 174. A lip 186 on the upper guide block 172 engages the nose 187 of the upper ejector arm, rotating it out of the plane of the spring 18B whereby the ejector arm will not engage the spring during retraction of the mandrel 162. On the next stroke of the machine the nose 187 of the ejector arm 166 will engage the back edge of the spring at 18B as the ejector arm moves forwardly. This pushes the spring into alignment with the discharge chute 178. The stuffer 180 then moves down into the discharge chute and pushes the spring to the location shown at 18C. The spring falls onto a stack of previously-made springs, in the order in which it came out of the shaping die. It will be understood that the discharge chute 178 extends to a suitable stacking device (not shown) where the stack of springs can be packaged in a manner which will maintain the stack intact. Appropriately-sized plastic bags can be used for this purpose.

Figure 17:
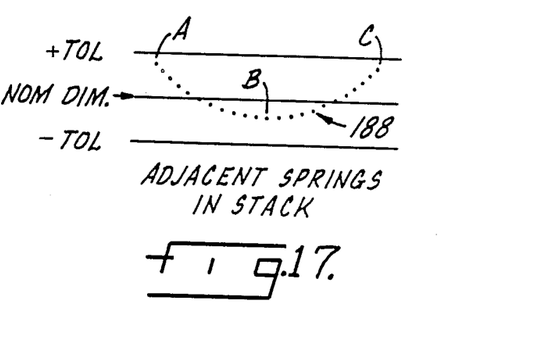
FIG. 17 is a sketch illustrating a typical tolerance variation curve of adjacent springs in a stack.

FIG. 17 illustrates one of the advantages of the above-described method, namely, a continuous tolerance variation. The curve 188 represents some actual dimension of adjacent springs in a stack (the particular dimension is not critical). The specifications of the spring will include a nominal value and a positive and negative tolerance for that dimension. The springs in a stack will have some distribution of actual dimensions within the tolerance envelope. Springs formed in accordance with the present invention will inherently develop a smooth, continuous curve, such as 188, of tolerance variations. The tolerance variation may not necessarily be sinusoidal as shown, nor are the particular period or amplitude important. The significant point here is that the curve will not exhibit discontinuities which occur under prior processes which required springs to be cleaned. For example, under previous processes the springs are stacked entirely at random and it would be possible for springs having dimensions shown at A, B and C in FIG. 17 to be placed adjacent one another in a stack. Such wide tolerance variations create difficulties for the automated assembly equipment used to assemble the spring in a finished cassette. Under the process of the present invention, the part shown, for example at B, will always have a neighboring part whose dimension will approach that of part B. This is what is meant by a continuous tolerance variation.

Whereas a preferred form of the invention has been shown and described, it will be understood that variations may be made therein without departing from the scope of the following claims.

I claim:

1. A method of making a reel-pressure spring for magnetic tape cassettes, including the steps of:
   (a) feeding a strip of spring material into a shaping die for cutting and forming the strip material into a finished spring, said strip having a width equal to the width of the finished spring, the shaping die being actuated by a punch press which produces at least one spring per press cycle;
   (b) clamping the strip material near its end and severing an individual spring blank from the end of the strip by cutting completely across the width of the strip behind the clamping location so the severed blank remains fixed;
   (c) forming the blank into a finished spring;
   (d) releasing the clamp on a finished spring, and ejecting finished springs from the shaping die to an intermediate location during one press cycle;
   (e) advancing the spring from said intermediate location into a discharge chute during the succeeding press cycle; and
   (f) stacking the finished springs adjacent one another in the chute in the order in which they were formed in the shaping die.

2. The method of claim 1 further comprising the steps of feeding the strip material into a punch die for piercing the strip material and piercing the strip material with said die.

3. The method of claim 2 wherein the shaping and punch dies are operated without lubrication.

4. The method of claim 3 further comprising the steps of ejecting finished springs from the shaping die into a discharge chute and stacking the finished springs adjacent one another in the chute in the order in which they were formed in the shaping die.

5. The method of claim 4 wherein the strip material is fed into the shaping die from a traverse-wound coil.

6. The method of claim 4 further comprising the step of cleaning the strip material prior to feeding it into the shaping die.

7. The method of claim 1 wherein the shaping die is operated without lubrication.

8. The method of claim 1 wherein the strip material is fed into the shaping die from a traverse-wound coil.

9. The method of claim 1 wherein the severing step is characterized by cutting along a curved line to impart a rounded end to the blank.

10. The method of claim 9 further characterized in that a second curved line is cut to impart a rounded end to the strip material.

11. The method of claim 1 wherein the severing step is characterized by cutting an hourglass-shaped portion out of the strip material such that the trailing edge of the blank and the leading edge of the strip material are rounded.

12. The method of claim 1 further comprising the step of cleaning the strip material prior to feeding it into the shaping die.

13. A method of compiling a stack of reel-pressure springs for magnetic tape cassettes, the stack being suitable for supplying springs to automated assembly equipment which installs individual springs in a cassette, including the steps of:
   (a) feeding a strip of spring material into a shaping die;
   (b) cutting and forming the strip material in the shaping die into a finished spring;
   (c) ejecting finished springs from the shaping die into a discharge chute;
   (d) stacking the finished springs adjacent one another in the chute in the order in which they were formed in the shaping die; and
   (e) packaging the stack of finished springs in means for maintaining the stack intact until it is supplied to the automated cassette assembly equipment so that said equipment receives a continuous tolerance variation stack, and wherein the shaping die is operated by a punch press which produces at least one spring per press cycle and wherein the step of ejecting finished springs from the shaping die is characterized by the steps of advancing a finished spring from said die to an intermediate location during one press cycle, and then further advancing the spring from said intermediate location into said discharge chute during the succeeding press cycle.

14. A method of making reel-pressure springs for magnetic tape cassettes, including the steps of:
   (a) feeding a strip of spring material having a width equal to the width of the finished spring into a first work station;
   (b) piercing the strip material with a punch die at the first work station to make at least one mounting hole in the strip material;
   (c) feeding the strip material into a second work station;
   (d) clamping the strip material near its end;
   (e) severing an individual spring blank from the end of the strip by cutting completely across the width of the strip behind the clamping location so the severed blank remains fixed;
   (f) forming the blank into a finished spring with a shaping die at the second work station;
   (g) releasing the clamp on the finished spring;
   (h) ejecting the finished spring from the second work station to a discharge chute;
   (i) stacking the finished springs in the discharge chute in the order in which they were formed in the second work station; and
   (j) packaging the stack of finished springs in means for maintaining the stack intact.

15. The method of claim 14 wherein the punch and shaping dies are operated by a punch press which produces at least one spring per press cycle and wherein the step of ejecting a finished spring from the second work station is characterized by the steps of advancing a finished spring from said second work station to an intermediate location during one press cycle, and then further advancing the spring from said intermediate location into said discharge chute during the succeeding press cycle.

16. The method of claim 14 further characterized in that a spring blank is made by severing the end of the strip material with an hourglass-shaped cut such that the trailing edge of the blank and the leading edge of the strip are rounded.

* * * * *